US009409621B2

(12) United States Patent
Hunt (10) Patent No.: US 9,409,621 B2
(45) Date of Patent: Aug. 9, 2016

(54) BICYCLE WITH COORDINATED PEDAL AND UPPER BODY LEVERAGE

(71) Applicant: Alexander Clark Hunt, Wilmington, NC (US)

(72) Inventor: Alexander Clark Hunt, Wilmington, NC (US)

(*) Notice: Subject to any disclaimer, the term of this patent is extended or adjusted under 35 U.S.C. 154(b) by 0 days.

(21) Appl. No.: 14/588,227

(22) Filed: Dec. 31, 2014

(65) Prior Publication Data

US 2016/0185416 A1 Jun. 30, 2016

(51) Int. Cl.
*B62M 1/12* (2006.01)
*B62M 1/36* (2013.01)
*B62K 21/18* (2006.01)
*B62M 23/02* (2010.01)

(52) U.S. Cl.
CPC .............. *B62M 1/12* (2013.01); *B62K 21/18* (2013.01); *B62M 1/36* (2013.01); *B62M 23/02* (2013.01)

(58) Field of Classification Search
CPC .......... B62M 1/12; B62M 1/36; B62M 23/02; B62K 21/08
See application file for complete search history.

(56) References Cited

U.S. PATENT DOCUMENTS

| | | | | | |
|---|---|---|---|---|---|
| 577,895 | A * | 3/1897 | Wales | ...... | B62M 1/12 280/234 |
| 614,146 | A * | 11/1898 | Vonhausen | ...... | B62M 1/12 280/234 |
| 619,637 | A * | 2/1899 | Tucker | ...... | B62M 1/12 280/234 |
| 645,579 | A * | 3/1900 | Tolson | ...... | B62M 1/12 280/234 |
| 666,081 | A * | 1/1901 | Williams | ...... | B62M 1/12 280/234 |
| 961,370 | A * | 6/1910 | Wheeler | ...... | B62M 1/12 280/234 |
| 4,147,370 | A * | 4/1979 | Lindsey, Jr. | ...... | B62M 1/12 280/234 |
| 4,152,005 | A * | 5/1979 | Vanore | ...... | B62M 1/12 280/234 |
| 4,189,166 | A * | 2/1980 | Lindsey | ...... | B62K 3/002 280/234 |
| 4,479,660 | A * | 10/1984 | Pattison | ...... | B62M 1/36 280/261 |
| 4,541,647 | A * | 9/1985 | Braun | ...... | B62M 1/12 280/234 |
| 4,726,600 | A * | 2/1988 | Wu | ...... | B62M 1/12 280/234 |
| 4,773,663 | A * | 9/1988 | Sawyer | ...... | B62M 1/36 280/261 |
| 5,039,122 | A * | 8/1991 | Deutch | ...... | B62M 1/12 280/234 |
| 5,082,302 | A * | 1/1992 | Nacar | ...... | B62M 1/12 280/234 |
| 5,280,936 | A * | 1/1994 | Schmidlin | ...... | B62N 1/12 280/234 |
| 5,372,374 | A * | 12/1994 | Hudson | ...... | B62M 1/12 280/233 |
| 5,383,675 | A * | 1/1995 | Liebert | ...... | B62K 21/00 114/144 R |
| 5,511,810 | A * | 4/1996 | Tong | ...... | B62M 1/12 280/233 |
| 5,690,346 | A * | 11/1997 | Keskitalo | ...... | B62K 3/005 280/234 |
| 5,785,336 | A * | 7/1998 | Jang | ...... | B62M 1/12 280/233 |
| 6,688,623 | B1 * | 2/2004 | Yunaska | ...... | B62M 1/12 280/233 |
| 6,840,136 | B1 * | 1/2005 | Jones | ...... | B62M 1/36 280/259 |
| 7,140,626 | B1 * | 11/2006 | Keay | ...... | A63B 21/0004 280/230 |
| 7,967,313 | B1 * | 6/2011 | Eggert | ...... | B62K 5/02 280/224 |
| 2011/0095505 | A1 * | 4/2011 | Heath | ...... | B62M 1/12 280/210 |
| 2011/0148068 | A1 * | 6/2011 | Hunt | ...... | B62M 1/12 280/234 |
| 2012/0258840 | A1 * | 10/2012 | Eisenberg | ...... | A63B 22/001 482/57 |
| 2013/0175781 | A1 * | 7/2013 | Price | ...... | B62M 1/12 280/249 |
| 2014/0015219 | A1 * | 1/2014 | Price | ...... | B62K 21/12 280/249 |

* cited by examiner

*Primary Examiner* — Kevin Hurley
*Assistant Examiner* — Gabriela C Craciun
(74) *Attorney, Agent, or Firm* — Robert W. Pitts

(57) ABSTRACT

A cycle or bicycle is driven both by rotation of pedals that drive a rear wheel in a conventional manner, and by fore and aft movement of the handlebars. Fore and aft movement of the handlebars about an adjustable hinge, which also rotate as a unit about a front wheel turning axis, is transmitted to a drive rod. The drive rod then drives an actuator mechanism which transfers force due to movement of the handlebars to the primary drive mechanism through which pedal power is also applied to the rear wheel. Forces generated by this movement of the handlebars is additive to forces applied by the rider directly to the pedals, in a coordinated manner that does not inhibit steering of the bicycle.

14 Claims, 9 Drawing Sheets

BICYCLE WITH COORDINATED PEDAL AND UPPER BODY LEVERAGE

BACKGROUND OF THE INVENTION

1. Field of the Invention

This invention is related to cycles, such as bicycles, that are driven by force applied by the rider. In this invention, the force applied by the rider is applied both by rotation of the pedals and by movement of a handlebar subassembly, which generates a force that is also transmitted to the primary drive chain or drive mechanism used to apply force to the cycle's rear wheels.

2. Description of the Prior Art

A number of suggestions have been made to employ movement of bicycle handlebars to propel a bicycle, either separate from or in conjunction with standard pedals. These attempts to incorporate arm and body movement with pedaling by the legs do not appear to have resulted in a viable or widely accepted means of propelling a bicycle. It would appear that one possible explanation is that the various prior art approaches do not effectively transmit force or coordinate the movement of the arms and the legs as well as the body, so that a rider can retain his balance and still operate the bicycle in the manner with which he or she has become accustomed.

One approach is to drive the front wheel by moving the handlebars while driving the rear wheel though the pedals. However, this amounts to a two wheel drive mechanism, which is different from a conventional single wheel drive. Turning the bicycle with a driven front wheel would appear to require the rider to adjust his normal technique.

Other suggestions have been made to move the handlebars up and down or to rotate them in a scissor like manner. U.S. Pat. No. 6,688,623 suggests that the opposite ends of handlebars be rotated in a horizontal plane about a central pivot point. None of these movements is similar to the manner in which a rider normally operates and a loss of balance and control may result or be difficult to learn. Other patents have suggested outrigger style upright handles, which are gripped vertically instead of horizontally. These handlebars could not be operated in a conventional manner as the bicycle must lean to negotiate turns making side to side movement cumbersome at best.

SUMMARY OF THE INVENTION

A cycle according to this invention can be ridden by a rider in a coordinated manner. The cycle has a frame, a front wheel, a rear wheel, a handlebar subassembly turning the front wheel relative to the frame and to the rear wheel and a pedal for driving the rear wheel. This cycle also has a steer tube on which the front wheel is mounted. A riser is connected to the handlebar subassembly and the steer tube to turn the steer tube and the front wheel about a turning axis. A drive rod is connected to the handlebar subassembly at a drive rod first end. Fore and aft movement of the rider's upper body imparted to the handlebar subassembly causes the drive rod to move fore and aft relative to the frame. The drive rod is connected to the handlebar assembly by a connection permitting rotation of the drive rod about three perpendicular axes relative to the handlebar subassembly. An actuator extending between a drive rod second end and the pedal transfers fore and aft movement of the drive rod to the pedal. Fore and aft movement of the handlebar subassembly results in a torque applied to the pedal, so that the cycle can be driven by fore and aft movement initiated by the rider's upper body together with rotation of the pedals powered by the rider's lower bod. Turning the cycle front wheel is uninhibited by fore and aft movement of the handlebar subassembly and the drive rod imparted by the rider's upper body. The riser can be a riser stem hinged relative to the steer tube. The riser can also be fixed to handlebars with a drive arm which rotates fore and aft relative to the riser connected to the drive rod.

A cycle or bicycle according to another aspect of this invention can be ridden by a rider in substantially a conventional, coordinated manner. The cycle has a frame, a front wheel, a rear wheel, handlebars turning the front wheel relative to the frame and to the rear wheel and a pedal for driving the rear wheel. This cycle or bicycle also includes a steer tube on which the front wheel is mounted, and a riser stem connected to the handlebars and the steer tube, to turn the steer tube and the front wheel about a turning axis. A hinge is located between the riser stem and the steer tube so that the riser stem is rotatable about a hinge axis extending perpendicular to the turning axis so that the handlebars can be rotated fore and aft about an arcuate path as the front wheel turns about the turning axis. A drive rod is mounted to the riser stem above the hinge. Fore and aft movement of the handlebars causes the drive tube to move fore and aft relative to the frame and to pivot relative to the frame about a drive pivot axis extending perpendicular to the frame. A sleeve connects the drive rod to the riser stem so that the angular orientation of the sleeve relative to the riser stem varies as the riser stem rotates about the turning axis. The planar orientation of the drive rod remains fixed relative to the frame as the drive rod moves fore and aft. An actuator extends between a drive rod at a second end and the pedal to transfer a force from the drive rod to the pedal as the drive rod moves fore and aft. Fore and aft arcuate movement of the handlebars imparts a force, acting about a moment arm, to the pedal, so that the cycle can be driven both by fore and aft arcuate movement of the handlebars applied by the rider through the rider's upper body together with rotation of the pedals powered by the rider's lower body. Turning or steering the cycle about the turning axis is uninhibited by fore and aft arcuate rotation of the handlebars.

This invention also comprises a cycle, such as a bicycle, in which reciprocal movement of a handlebar imparts a driving force to a rear wheel and in which steering of a front wheel by the handlebar is not restricted by reciprocal movement of the handlebars. This cycle includes a steer tube on which the front wheel is mounted. The steer tube turns relative to a cycle frame. A riser stem on which the handlebar is mounted, turns with the steer tube. A hinge connects the steer tube and the riser stem permitting fore and aft reciprocal movement of the handlebar as the front wheel is steered both left and right. A drive rod is connected to the riser stem, above the hinge, through a front connection permitting the riser stem to rotate relative to the drive rod as the cycle is steered either left or right. Fore and aft reciprocal movement of the handlebar and the riser stem imparts fore and aft movement to the drive rod. A pivoting member is mounted on the cycle frame. The drive rod being is connected to the pivoting member by a rear connection. Movement of the pivoting member is transferred to a primary driving subassembly driving the rear wheel. The drive rod can engage the riser stem directly above a hinge transmitting left and right rotation of the handlebars through the riser stem to a steerable front wheel. Steering of the front wheel by the handlebar is unaffected, by forward and rearward movement, at any position of the handlebars during forward and rearward movement of the handlebars.

DETAILED DESCRIPTION OF THE EMBODIMENTS

Figure 1:
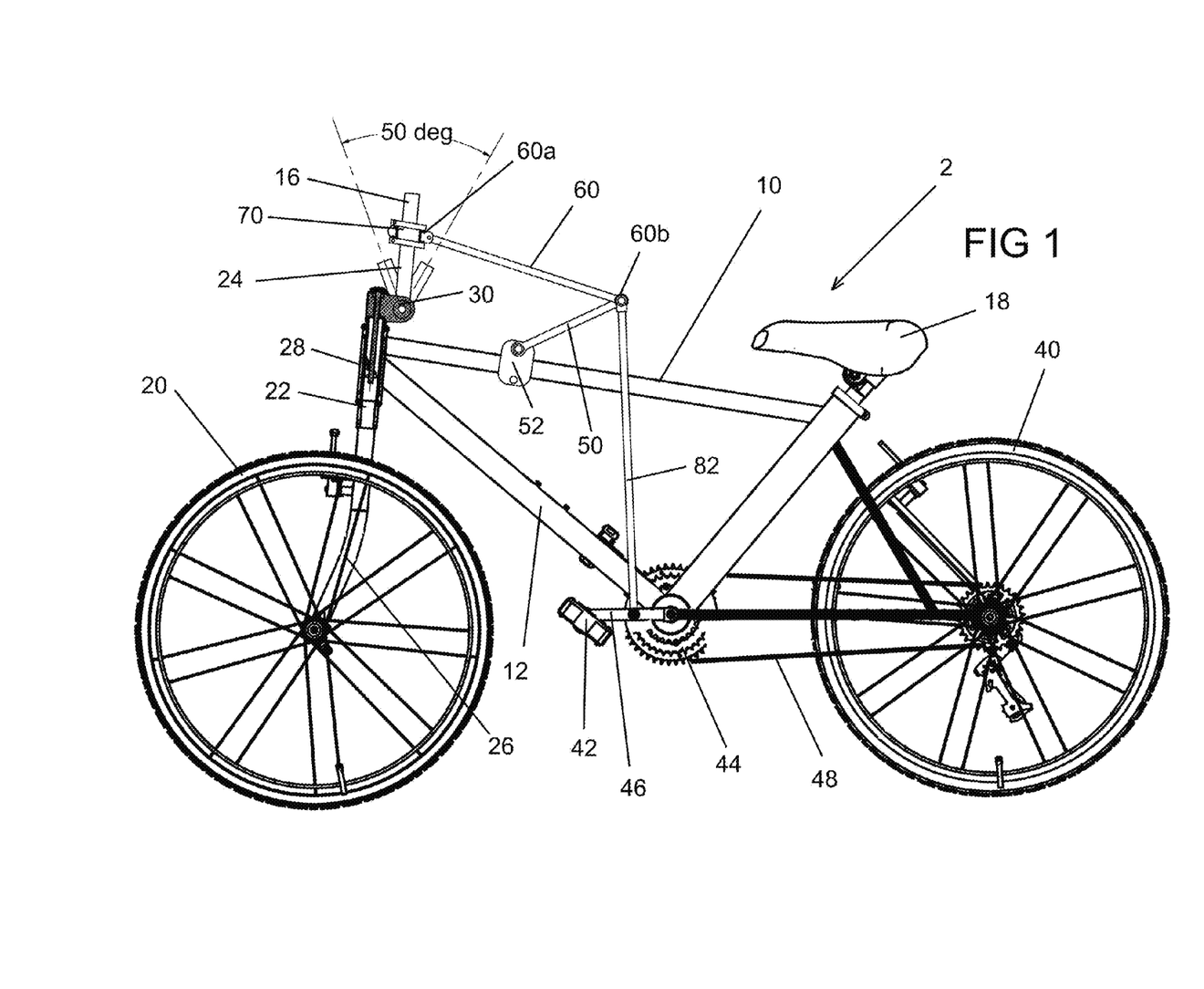
FIG. 1 is a side view of the preferred embodiment of this invention showing actuation of the rear drive chain through the pedals by both fore and aft movement of the handlebars as well as by conventional rotation of the pedals imparted by the rider through the lower part of his or her body.

FIG. 1 shows a preferred embodiment of a bicycle 2 in which fore and aft movement of the handlebars 16 or handlebar subassembly, primarily imparted by movement of the rider's upper body, is coordinated with torque applied to the bicycle pedals 42, primarily by the rider's lower body. The force applied by fore and aft movement of the rider's torso and arms generate the fore and aft movement of the handlebars 16. At the same time the rider transmits a force to the pedals 40 through his legs applies torque the rear wheel 40 through the primary drive chain 48 extending from the pedal sprocket to the rear wheel 40. The fore and aft movement of the handlebars 16 is transmitted through an actuation mechanism to the rear wheel 40, also through the primary drive chain 48. The forces and resultant torques applied by movement of the rider's upper body and by movement of the rider's lower body are additive so that more power can be applied to the rear wheel of the bicycle. Furthermore, the fore and aft movement of the handlebars 16 is coordinated with the rotation of the pedals 42 as the rider maintains his position on the bicycle seat 18. In the embodiment of FIG. 1-6, the fore and aft movement of the handlebars 16 takes place about a hinge axis that is perpendicular to the turning axis of the front wheel 20 so that fore and aft movement of the handlebars 16 allows the wheels to be turned in the same manner as with conventional fixed handlebars regardless of the instantaneous position of the handlebars 16 as they move along an arcuate path. The bicycle 2 can be turned about this turning axis and the turning and turning motion are uninhibited by fore and aft arcuate rotation of the handlebars 16.

The bicycle 2 comprises a frame 10 on which both the front wheel 20 and the rear wheel 40 are mounted, with the seat 18 and pedals 42 located in substantially the same position as on a conventional bicycle so that the rider can maintain substantially the same position as when riding a conventional bicycle. The front wheel 20 is mounted on a steer tube 22 that extends through a cylindrical bearing 28 fixed to the front of the frame 10. The steer tube includes a fork 16 on which the front wheel is mounted in a conventional manner. Note that the fork 26 can be angled forward so that the front wheel axle is located in front of the turning axis of the front wheel to provide more space for the rider in the same manner as for a conventional bicycle. The axis of the steer tube 22 above the fork 26 is aligned with the axis of the cylindrical bearing 18, which are coincident with and defines the turning axis of the bicycle 2.

A riser or riser stem 24 extends above the steer tube 22 and is attached at the upper end of the steer tube 22. The handlebars 16 are attached to the steer tube 22. In FIG. 1, the laterally extending sections of the handlebars 16 are not shown so that other components of this assembly, which are not common to a conventional bicycle, can be more readily depicted. Any number of conventional lateral handlebar sections, such as for example those shown in the alternate embodiment of FIG. 6, can be employed.

Figure 2:
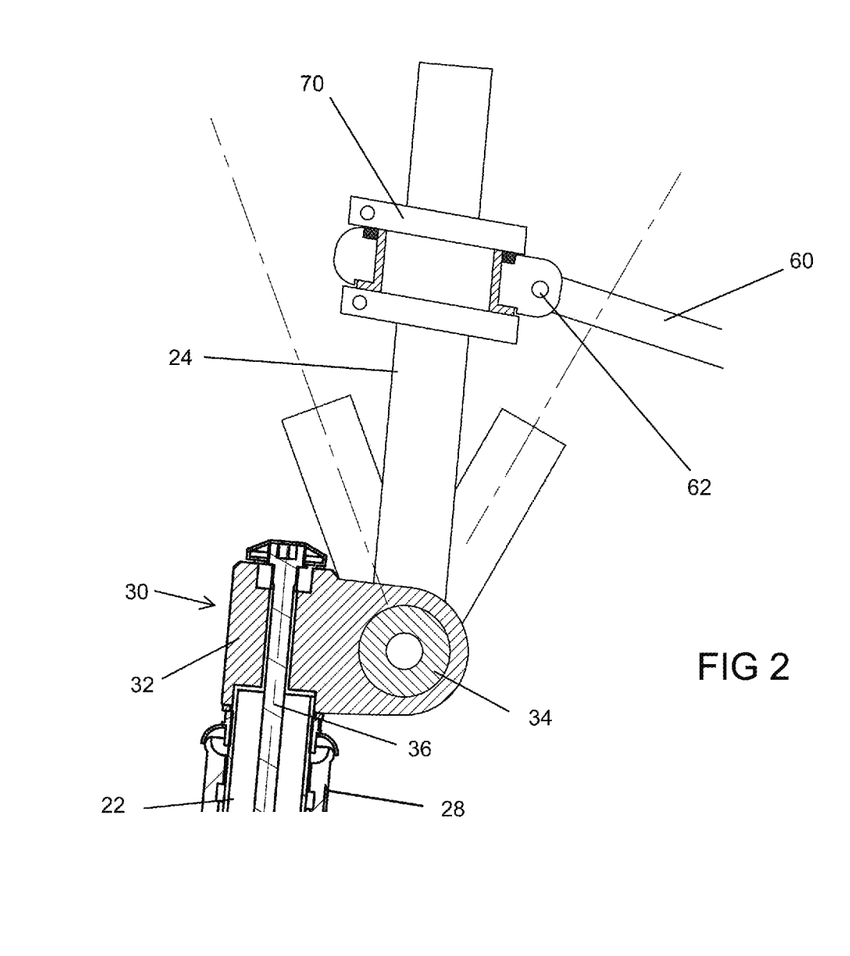
FIG. 2 is an enlarged view, partially in section, of the hinge connection of the handlebars and the front wheel steer tube as shown in FIG. 1.

The riser or riser stem 24 is mounted on the steer tube 22 by a hinge 30 so that the riser stem 24 can rotate, fore and aft, relative to the steer tube 22. The hinge 30 is shown in more detail in FIG. 2. Hinge 30 includes a hinge body 32 having two bores extending perpendicular to each other. One cylindrical bore receives the cylindrical hubs 34 extending perpendicular to the riser stem 24 at its lower end. These hubs 34 and the bore thought which they extend define the hinge axis about which the handlebars 16 rotate as they move fore and aft. The other bore receives a pin 36 that is attached to the steer tube 22 at the top of the steer tube. This pin 36, along with the steer tube 22, and the bore though which pin 36 extends, are aligned with and define the turning axis of the front wheel 20 and the bicycle 2. The pin 36 extends perpendicular to the hubs 34. In the embodiment shown in FIGS. 1 and 2, the riser or riser stem 24 and the handlebars 16 attached thereto are capable of rotating through an arc of fifty degrees, as shown in FIG. 1 upon fore and aft movement of the handlebars 16. This angle of fifty degrees is merely representative of the extent to which the handlebars 16 can rotate, and it should not be considered limiting, either for maximum or minimum angular travel of the handlebars 16. The fragmentary sections shown in FIGS. 1 and 2 are included to show the position that the riser stem 24 would occupy at the maximum forward and rearward positions of the representative embodiment shown in FIGS. 1 and 2.

Fore and aft movement of the handlebars 16 is transmitted through a drive rod 60, which is attached to a sleeve 70 mounted on the riser stem 24. The sleeve or collar 70 encircles the riser stem 24, but as the handlebars 16 are turned, the riser stem 24 rotates within sleeve 70. The sleeve 70 does not rotate relative to the frame 10. During use, clamps 70a and 70b, above and below the sleeve 70, prevent movement of the sleeve 70 parallel to the riser stem 24. The clamps 70a and 70b are fixed to the riser stem 24 and rotate with the riser stem 24, but rotate relative to the sleeve 70. However, these clamps 70a and 70b can be loosened and the sleeve 70 can be repositioned relative to the riser stem 24. If the sleeve 70 is repositioned closer to the hinge 30, the extent of fore and aft travel of the primary drive rod 60 will remain the same as when the sleeve 70 is moved toward the handlebars, but the leverage that is applied by the rider will be different. As will be subsequently discussed, the angle through which the handlebars 16 and riser stem 24 move during a complete rotation of the pedals 42, will be dependent upon the axial location of the sleeve 70 relative to the hinge 30. The handlebar drive mechanism can therefore be adjusted to accommodate the particular rider, because a person with shorter arms may feel uncomfortable when unable to maintain a proper contact with handlebars 16 at their foremost position, if the sleeve 70 is positioned for a taller rider. A taller rider can gain more leverage and deliver more torque if the sleeve 70 is spaced further above the hinge 30. The extent of fore and aft movement of the handlebars 16 will be dictated by rotation of the pedals 46 and the position of the sleeve 70 on the riser stem 24.

The primary drive rod first end 60*a* at the front of primary drive rod 60 is pivoted relative to the sleeve 70 to which it is attached. The primary drive rod 60 is connected to the sleeve 70 by a ball and socket connection 62. This connection permits rotation about three axes. In the preferred embodiment of FIGS. 1 and 2, these axes are the hinge axis, the turning axis and the drive rod axis, which extends through the opposite driver rod ends 60*a* and 60*b*. Although the drive rod 60 remains parallel to the frame 10, the drive rod 60 can twist about its own axis relative to the handlebars 16 and the riser stem or riser 24, which occurs when combined turning rotation and fore and aft rotating reciprocal movement of the handlebar subassembly occurs as the bicycle is ridden. However, when the front wheel 20 is turned by rotation of riser stem 24 with steer tube 22, the primary drive rod 60 remains in a plane parallel to the frame 10, and in the preferred embodiment remains parallel to a first side 12 of the frame 10. In other words, the angular orientation of the sleeve 70 relative to the riser stem 24, varies as the riser stem rotates about the turning axis, and the planar orientation of the drive rod 60 remains fixed relative to the frame 10 as the drive rod 60 moves fore and aft. The second or rearward end 60*b* of primary drive rod 60 is pivotally mounted to a pivoting crank member 50 or actuator. The pivoting crank member 50 is pivotally attached at its opposite end to a crank mount 52 secured to a frame upper bar on a drive rod pivot axis extending perpendicular to the crank 50 and the frame 10. The primary drive rod 60 is also attached to a secondary drive rod 82 at the primary drive rod second rod rear end 60*b*.

The primary drive rod 60, the crank 50 and the secondary driver rod 82 thus form a three bar linkage or actuator subassembly for transmitting a force developed by fore and aft movement of the handlebars 16 to the pedal arm 46 to which the lower end of the secondary drive rod is attached. This mechanism means that during on rotation of the pedals 42, the handlebars 16 will move through a complete cycle from the foremost position to the aft or rearmost position and then returning to the foremost position. Since the handlebars 17 and the pedals 46 simultaneously move through a complete cycle, and since the riser stem 24 remains aligned with the turning axis during this complete cycle, even though the handlebars rotate relative to the steer tube about hinge 30, the handlebar drive and the pedal drive is coordinated. Steering is therefore is unaffected and uninhibited by fore and aft movement and rotation of the handlebars 16. The length of the crank 50 can be less than that shown in FIG. 1, and it might be considered exaggerated for purposes of illustration. A shorter crank 50 would provide additional space for the rider.

The secondary drive rod 82 is pivotally attached to the pedal arm 46, between the pedal 42 and the axis of rotation of the pedal 44, at the lower end of the secondary drive rod 82. Aft movement of the handlebars 16 imparts aft movement of the primary drive rod 60, and this movement is transmitted to the secondary drive rod 82, which moves down during aft movement of the handlebars 16 and primary drive rod 60. Downward movement of the secondary drive rod 82 imparts a downward force to the pedal 42 and a moment relative to the axis of rotation of the pedal 42. The orbiting motion of the primary drive rod 60, the crank 50 and the secondary drive rod 8 determine the appropriate length of fore and aft travel of the handlebars 17. Downward, counterclockwise rotation of the pedal arm 46, as seen in FIG. 1, imparts counterclockwise rotation of the pedal arm 46, which also rotates in the counterclockwise direction upon downward movement of the pedal 42 imparted by the rider's lower body or legs. As the handlebars 16 and primary drive rod 60 simultaneously move forward, the pedal 42 will be rising, continuing the counterclockwise rotation again as seen in FIG. 1. The pedal 42 on the opposite side 14 of the frame 10 (See FIG. 4) moves down as the rider's other leg moves down, but the forward movement of the handlebars 16 can be accompanied by pushing on the handlebars 16 by the rider. The moving handlebars 16 and the rotating pedals thus always impart additive, coordinated forces to the pedal sprocket 44 and thus to the primary drive chain 48. Furthermore this only requires natural coordination by the rider, and does not require any movement inconsistent with normal movement on a conventional bicycle except that the handlebars 16 are now free to move between their fore and aft positions.

Figure 3:
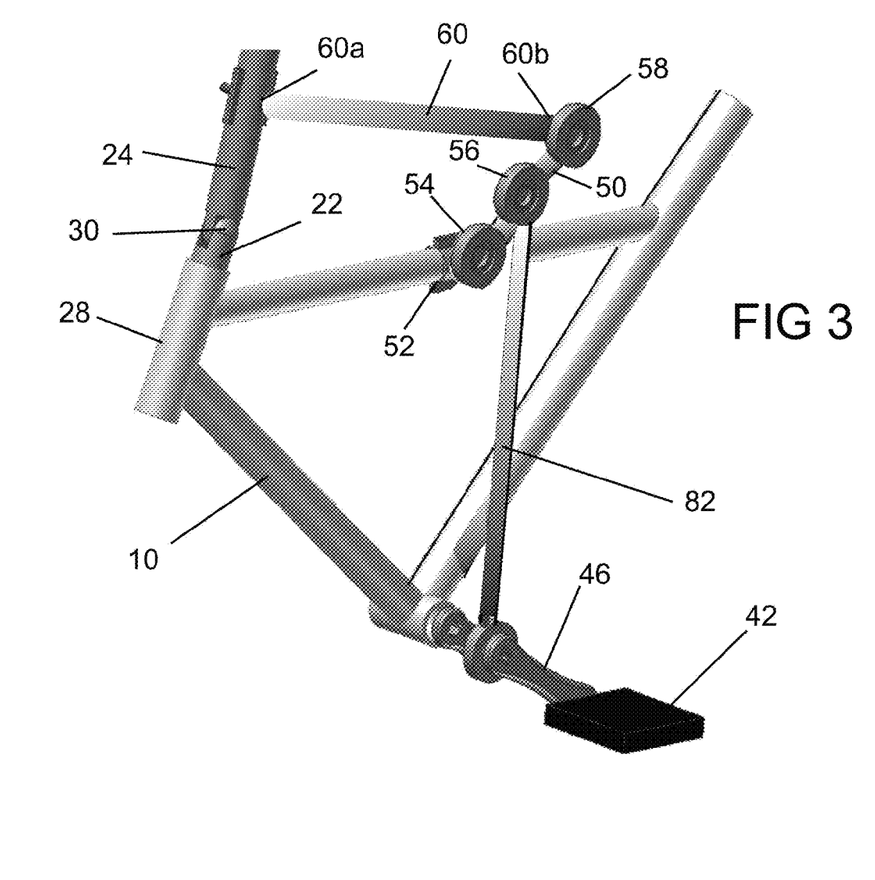
FIG. 3 is a three dimensional view showing a similar drive mechanism including a primary drive rod and a secondary drive rod.
Figure 4:
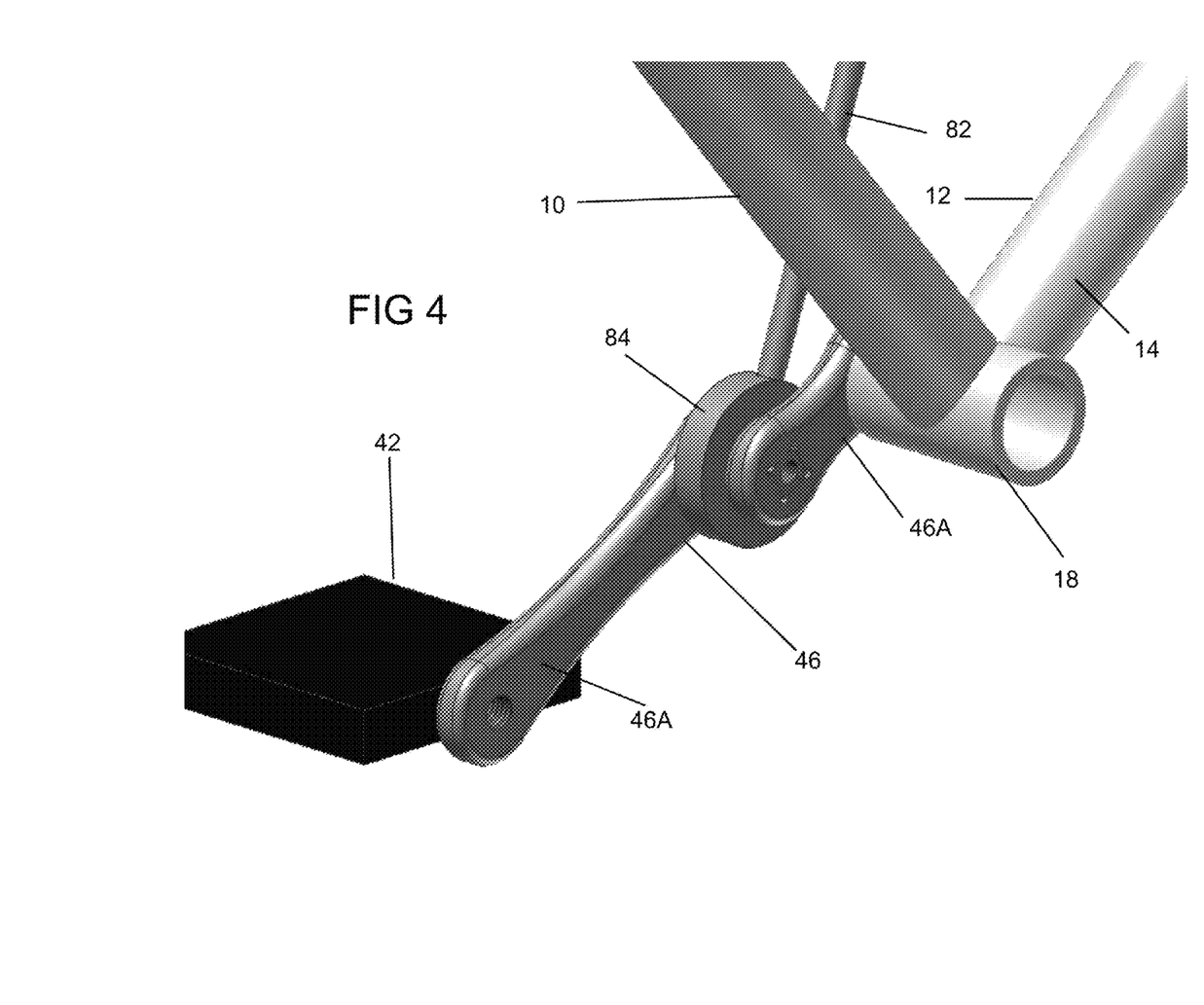
FIG. 4 is an enlarged view of the attachment of the secondary drive rod, as shown in FIG. 3, with one of the pedal arms.
Figure 5:
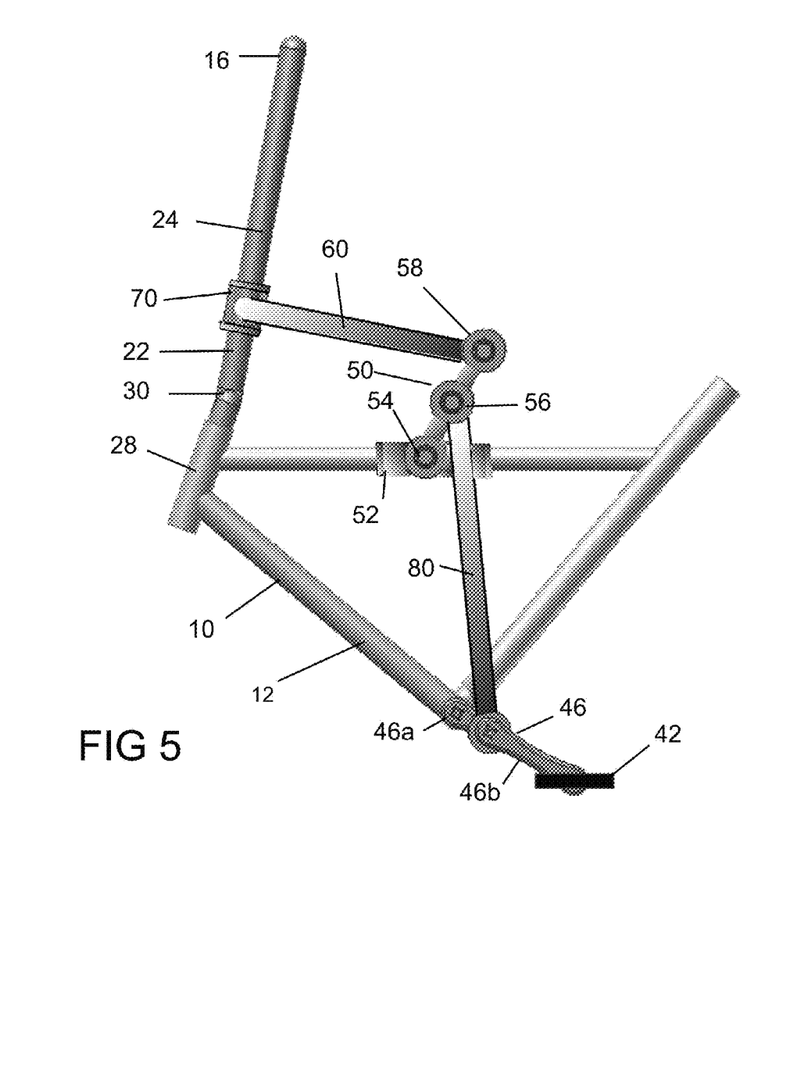
FIG. 5 is a side view of the embodiment depicted in FIG. 3.

The embodiment depicted in FIGS. 1 and 2 is not the only configuration that would incorporate this invention. FIGS. 3-5 show another version. In this embodiment the primary drive rod is attached to a bearing 58 at one end of the crank 50. The secondary drive rod 80 is attached by another bearing 56 located between opposite ends of the crank 50. The crank 50 is also mounted to the frame 10 by a third bearing 54, which is mounted on the crank mounting member 52. This configuration would change the mechanical advantage generated by fore and aft movement of the handlebars 16 and the primary drive rod 60.

Another difference show in FIGS. 3 and 4 is that a clevis type hinge 30 is employed in this embodiment. A protruding central section on the lower end of the riser stem 24 fits into a gap between two wings extending upward from the steer rod 22, as best seen in FIG. 3. A pivot pin connects the two pivoting portions of this hinge 30 rotating about a hinge axis that would extend generally in line with the handlebars (not seen in FIGS. 3 and 5). Unlike the hinge shown in FIGS. 1 and 2, this hinge axis, shown in FIGS. 3 and 5, would intersect the turning axis as well as being perpendicular to the hinge axis.

FIG. 4 also shows that the actuator mechanism including the secondary drive rod 82, which would extend along a first side 12 of frame 10. The primary drive rod 60 and the pivoting or crank member 50 would also be on this same first side 12. The primary drive rod would be attached to the sleeve 70 in a plane on the first side 12 of frame 10. As seen in FIG. 4, the secondary drive rod 82 is attached to the pedal arm 40 on this same first side 12. Secondary drive rod 82 is attached to a bearing 84 between two sections 46*a* and 46*b* which form the pedal arm 46. The pedal arm is attached to a sprocket axle (not shown) and this sprocket axle would extend through a cylindrical bearing 18, which is fixed to the frame 10. A sprocket 44 would then be attached to the sprocket axle on a second side 14 of the frame 10. Thus the handle bar actuation mechanism would be mounted on a different side of the frame 10 from the sprocket 44 and the primary driver chain 48, which need not differ in the embodiments of FIGS. 1-5.

Another version similar to the embodiments of FIGS. 1-5 would allow the handlebar actuation mechanism to be modified so that the handlebar force could be transmitted to the pedal 46 during the downward movement of either leg. FIG. 1 shows an embodiment in which the force exerted during rearward movement of the handlebars 16 would be transmitted to the pedal sprocket 44 during downward movement of the rider's left leg, i.e. counter clockwise rotation from the position shown in FIG. 1. Modification of the crank 50, as well as repositioning of the point where the secondary driver rod 82 is attached to the modified crank 50 would allow the force generated during rearward movement of the handlebars 16 to be transmitted to the pedal sprocket 44 during downward movement of the rider's right leg. To accomplish this, the crank 50 would need to extend on opposite sides of the pivot point at which the crank 50 is mounted to the mounting member 52. This modified crank 50 would then pivot or partially rotate about an intermediate point, which could be, need not be, the center of the crank 50. Alternatively a disc could be substituted for the linear crank 50. With this modified crank, the secondary rod 82 could be attached to the crank 50 either to the same side as the crank 50, as shown in FIG. 1, or on the opposite side of a modified crank. When mounted in the position shown in FIG. 1, the handlebars 16 would move aft as the rider's left leg moves downward. When mounted on the side of a modified crank, opposite the position shown in FIG. 1, the handlebars 16 would move rearward as the rider's right leg moves downward. In either case the crank 50 or an equivalent disc will oscillate in opposite directions during the entire cycle of handlebar movement, but will not rotate through three hundred sixty degrees. When a modified, generally centrally pivoting crank of this type, is employed then the same drive rods 60 and 82 can be employed for either a primary left leg drive or a primary right leg drive configuration. In either case the entire handlebar drive mechanism would be on the first side 12 of the frame 10 opposite from the side 14 on which the sprocket mechanism is mounted.

Figure 6:
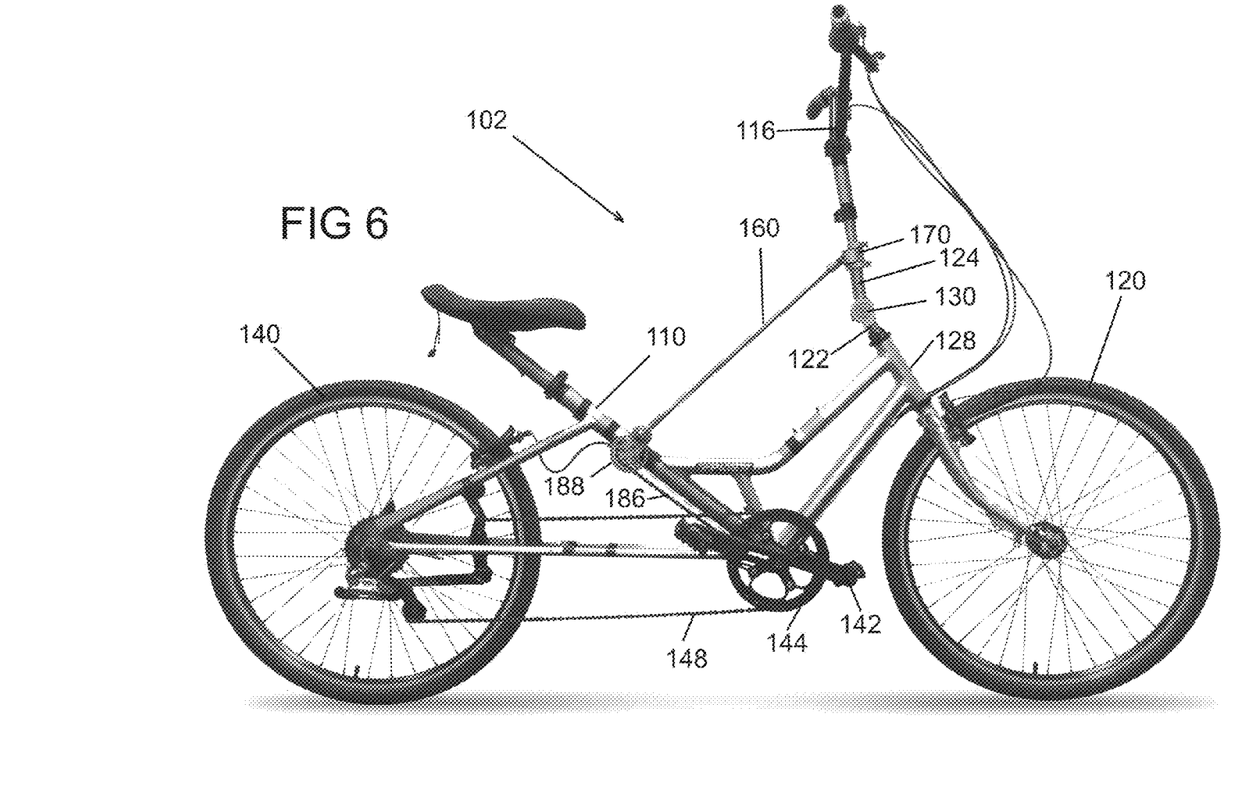
FIG. 6 is a view of an alternate embodiment in which the secondary drive rod, shown in the embodiments of FIGS. 1-4, is replaced by a secondary drive chain.

FIG. 6 shows that this same handlebar drive mechanism can be employed on a bicycle that uses a secondary drive chain 186 instead of a secondary drive rod 82 as in FIGS. 1-5. The bicycle 102, shown in FIG. 6, includes a frame 110 with a front wheel 12 and a rear wheel 140 to which forces generated by movement of the handlebars 116 and the pedals 142 are transmitted to drive the bicycle 102. The handlebars 116 are mounted on a riser stem 124 which rotates relative to a steer tube 122 about a hinge 130. The hinge 130 is similar in construction to the hinge shown in FIG. 3, although the same hinge shown in FIGS. 1 and 2 could be employed. The steer tube 122 rotates within a frame bearing 128 to turn the front wheel and turning is not affected by fore and aft movement of the handlebars 116 for the same reasons discussed with reference to the other representative embodiments. The pedals 144 and primary drive sprocket 144 drive the primary drive chain 144 in substantially the same manner as discussed with reference to the other embodiments. Fore and aft movement of the handlebars 116 is transmitted to a primary drive rod 16 which pivots relative to an adjustable sleeve 170 in the same manner as previously discussed. The primary drive rod 160 does not, however drive a secondary drive rod. Primary drive rod 160 drives a secondary sprocket 188, which is mounted on the frame 110. When the handlebars 116 move from their foremost position to their aftmost position, and then back to the foremost position, the secondary sprocket 188 rotates three hundred and sixty degrees, in a counterclockwise direction from the perspective shown in FIG. 6. The secondary sprocket 188 continues to rotate in the same direction. A secondary drive chain 186 extending between the secondary sprocket 188 and the primary sprocket 144 then transmits the force developed by fore and aft movement of the handlebars 116 to the primary sprocket 144. Rotation of the primary drive sprocket 144 then drives the primary drive chain 148 and then the rear wheel 140. The forces developed by fore and aft movement of the handlebars 116, generated primarily by movement of the rider's upper body, is thus applied to the rear wheel in addition to the force applied by the rider's legs directly driving the pedals 142 in a coordinated manner so that the rider can maintain his balance and can still turn the front wheel 120 in any fore or aft position of the handlebars 116.

Figure 7:
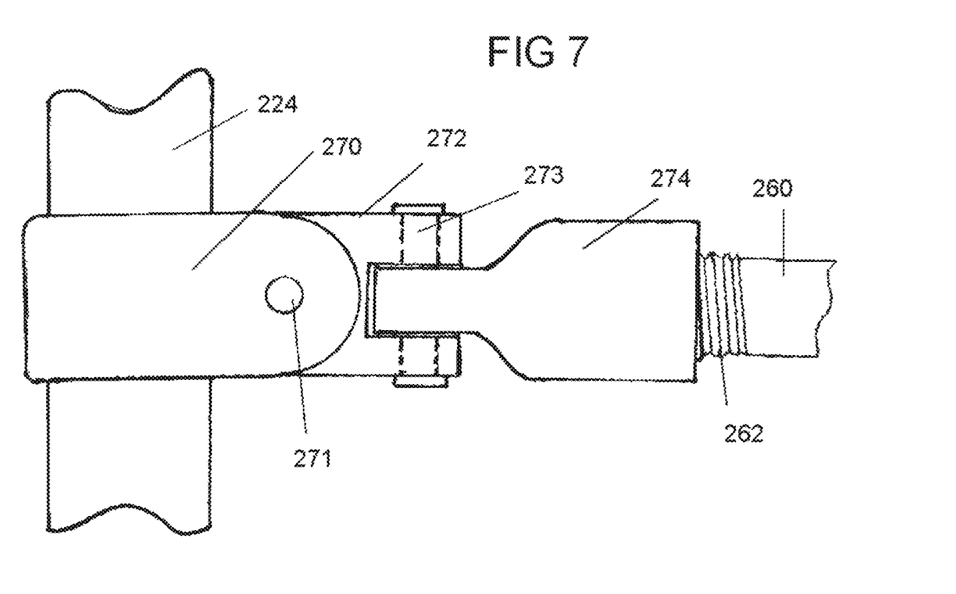
FIG. 7 is an alternate embodiment of a connection between the handlebar subassembly and the drive rod, which is capable of rotation about three perpendicular axes, in one of which the drive rod twists about its own axis.

The ball and socket connection 62 between the drive rod 60 and the sleeve 70 is not the only way to provide for rotation of the drive rod 60 relative to the handlebar subassembly 16 about three perpendicular axes. FIG. 7 shows an alternate connection between a drive rod 260 and a riser stem 224. In this embodiment, the sleeve 270 is fixed relative to the riser stem 224. The sleeve 270 is hinged relative to an intermediate connector 272 about a hinge pin 271 and can thus rotate about a first hinge axis. This first axis can also be termed a lateral axis about which fore and aft movement occurs. A second pin 273 extending through the opposite end of intermediate connector 272 defines a second axis perpendicular to the first hinge axis. This second axis would correspond to a turning axis. The second pin 273 connects the intermediate connector 272 to a drive rod fitting 274. The drive rod 260 is connected to the drive rod fitting 274 by threads 262. In this embodiment the treads 262 are not bottomed so the drive rod 260 can turn or twist relative to the drive rod fitting 274 as the male threads 262 on the drive rod 260 rotate relative to female threads on the interior of the drive rod fitting 274. Thus the drive rod 260 can rotate relative to its own axis, which would extend between opposite ends thereof. This would constitute a third perpendicular axis, so that the drive rod can rotate about three mutually perpendicular axes relative to the riser stem 224 and to the handlebar subassembly mounted thereon. At all times during fore and aft and turning movement, the drive rod (or its projection) and the drive axis extends through the turning axis.

Figure 8:
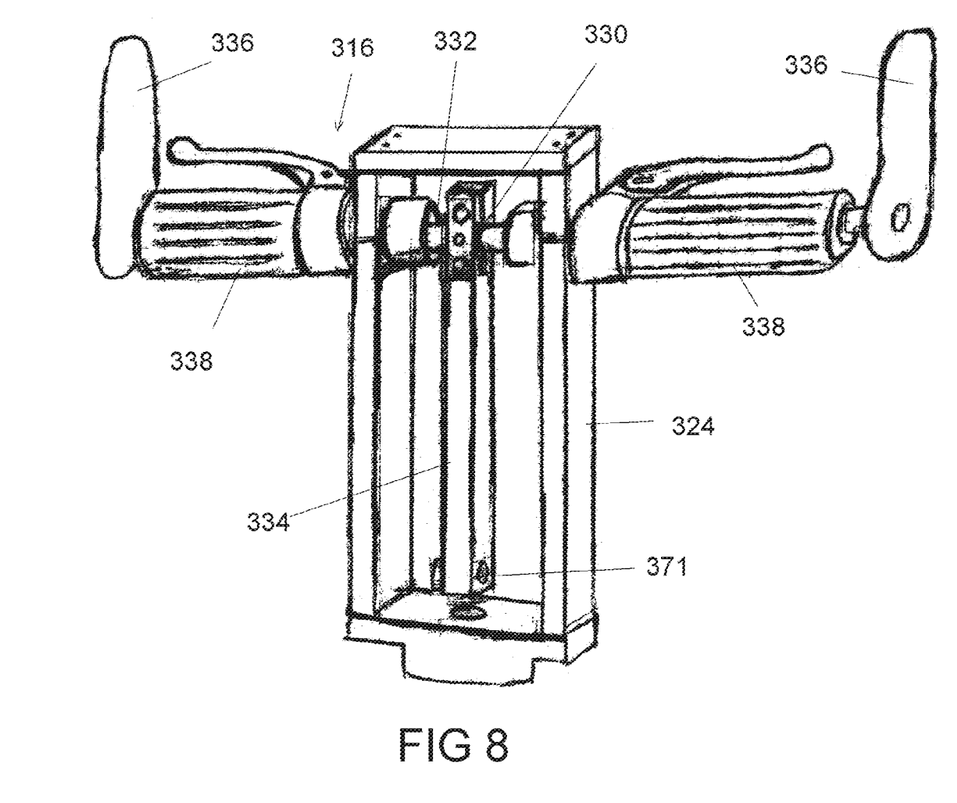
FIG. 8 is another alternate embodiment of the cycle according to this invention in which handles rotate relative to handlebars fixed relative to a riser to impart reciprocal fore and aft movement of a drive arm to transfer force and movement to a drive rod.
Figure 9:
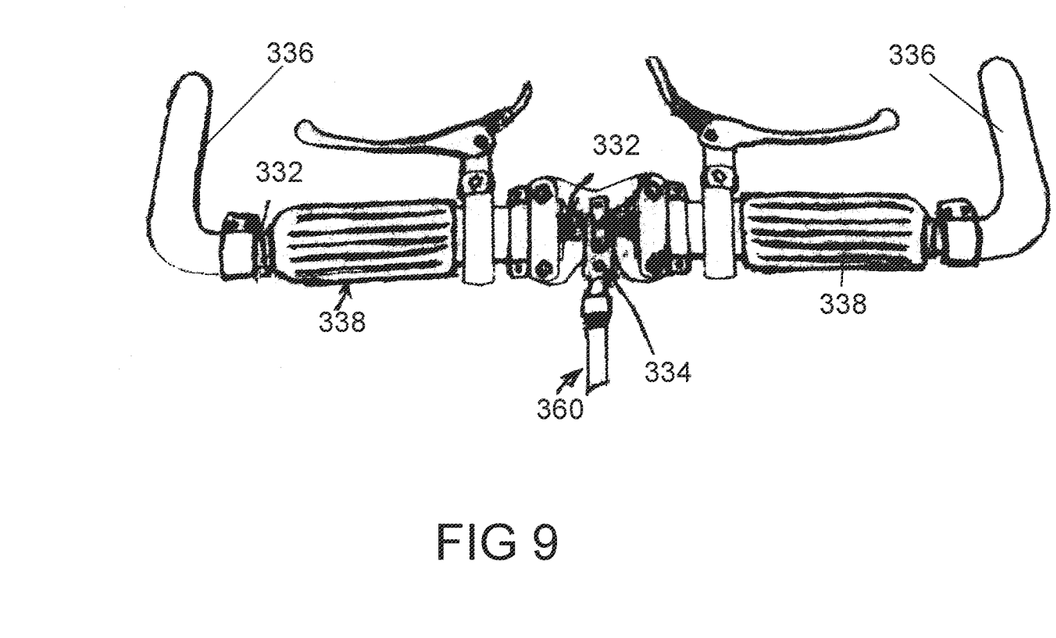
FIG. 9 is a top view of the handlebar subassembly of claim 8.

In the embodiments of FIGS. 1-6, the entire handlebars 16 or handlebar subassembly rotate and reciprocally move fore and aft under the influence of the rider's hands and arms or upper body. The embodiment of FIGS. 8 and 9 show that the fore and aft movement may result from movement of only a portion of the handlebar subassembly 316. In this embodiment handles 336 are located at opposite ends of the handlebar grips 338, which can remain stationary. The handles or levers 336 are connected to each other by a rotating rod 332 extending therebetween. This rotating rod 332 is mounted on a riser 324 by means of bearings so that the rod 332 can rotate relative to the riser 324 about an hinge point 330. A lever arm 334 is connected to the rotating rod 332 and extends downward between opposite side members forming the riser 324. The riser 324 will be attached to the top of a steer tube, and the riser 324 will turn with the steer tube, but the riser 324 will not be hinged relative to the steer tube to which it is attached. The lever arm 334 will, however rotate fore and aft with the rotating rod 332 and the handles or levers 336 attached thereto. The drive rod 360 will be attached to the lever arm 334 at the lower end at 371. The attachment point 371 can include a ball and socket joint or a connection such as that shown in FIG. 7. Rotation about three mutually perpendicular axes will still be possible even though the drive rod 360 would remain parallel to the bicycle frame. These axes can be termed a turning axis, a lateral axis about which fore and aft movement occurs and a drive rod axis, with the drive rod (or its projection) extending through the turning axis at any fore and aft and or turning position. One advantage of the embodiment of FIGS. 8 and 9 is that the rider can ride this bicycle by gripping the stationary handlebar grips 338 instead of the moving handles 336 if he wishes. In that case the bicycle would be propelled only be the action of the rider's lower body with the pedals, and the position and movement of the rider's upper body need not be different from that when he or she would ride a conventional bicycle. However, the same coordinated power delivery by the rider's upper and lower body would still be possible when needed or desired.

The embodiments depicted herein are merely representative, and other embodiments would be apparent to one of ordinary skill in the art without departing from the invention as described herein by the following claims. For example this inventive mechanism is not limited to a bicycle, and could be employed with other cycles, for example in a tricycle. This invention could also be employed on a tandem bicycle. Furthermore modifications to this invention could be employed for handicapped riders, especially riders who cannot pedal a bicycle or who cannot generate adequate driving force with their legs. This invention does not interfere with conventional shifting of a bicycle. Therefore this invention can be employed in other configurations without departing from the scope of the following claims.

The invention claimed is:

1. A cycle configured to be ridden by a rider, the cycle comprising a frame, a front wheel, a rear wheel, a handlebar subassembly turning the front wheel relative to the frame and to the rear wheel and a pedal for driving the rear wheel, the cycle further comprising:
   a steer tube on which the front wheel is mounted;
   a riser connected to the handlebar subassembly and the steer tube to turn the steer tube and the front wheel about a turning axis;
   a drive rod connected to the handlebar subassembly at a drive rod first end, fore and aft movement of the rider's upper body imparted to the handlebar subassembly and the riser causing the drive rod to move fore and aft relative to the frame, wherein the drive rod is connected to the handlebar assembly by a connection on the riser permitting rotation of the drive rod about three mutually perpendicular axes relative to the handlebar subassembly, wherein the three perpendicular axes about which the drive rod rotates relative to the handlebar subassembly comprise a drive rod axis extending between the first and second ends of the drive rod, a turning axis about which the front wheel turns and a hinge axis between the steer tube and the riser about which the handlebar subassembly rotates during fore and aft movement thereof;
   an actuator extending between a drive rod second end and the pedal to transfer fore and aft movement of the drive rod to the pedal, so that fore and aft movement of the handlebar subassembly results in a torque applied to the pedal, so that the cycle can be driven both by fore and aft movement initiated by the rider's upper body together with rotation of the pedals powered by the rider's lower body, and
   wherein turning the cycle front wheel is uninhibited by fore and aft movement of the handlebar subassembly and the drive rod imparted by the rider's upper body; and
   wherein the drive rod is connected to the riser, comprising a riser tube, by a sleeve, the sleeve being rotatable relative to the riser tube about the turning axis wherein the sleeve is connected to the riser tube above and in line with the hinge between riser tube and the steer tube.

2. The cycle of claim 1 wherein the sleeve is shiftable along the riser to adjust arcuate travel of the handlebars to accommodate riders of different sizes.

3. The cycle of claim 1 wherein the actuator comprises a secondary drive rod, and the secondary drive rod is connected to the pedal on a first side of the frame and a drive sprocket is mounted on an opposite, second side of the frame with a drive chain extending between the drive sprocket and the rear wheel transferring forces applied both by fore and aft movement of the handlebars and rotation of the pedals imparted through legs of the rider to the rear wheel to power the cycle.

4. The cycle of claim 1 wherein the actuator comprises a chain.

5. The cycle of claim 1 wherein the handlebar assembly comprises a pair of handles joined by a rotating rod extending therebetween, the rotating rod being attached to a drive arm rotatable fore and aft by rotation of the handles, the drive arm being attached to the first end of the drive rod at a location spaced from the rotating rod to impart fore and aft movement to the drive rod.

6. The cycle of claim 5 wherein the drive arm is connected to the drive rod by the connection between the handlebar subassembly and the drive rod which permits rotation of the drive rod about three perpendicular axes relative to the handlebar subassembly.

7. A cycle configured to be ridden by a rider, the cycle comprising a frame, a front wheel, a rear wheel, a handlebar subassembly turning the front wheel relative to the frame and to the rear wheel and a pedal for driving the rear wheel, the cycle further comprising:
   a steer tube on which the front wheel is mounted;
   a riser connected to the handlebar subassembly and the steer tube to turn the steer tube and the front wheel about a turning axis;
   a drive rod connected to the handlebar subassembly through the riser at a drive rod first end, fore and aft movement of the rider's upper body imparted to the riser and the handlebar subassembly causing the drive rod to move fore and aft relative to the frame, wherein the drive rod is connected to the handlebar assembly by a connection permitting rotation of the drive rod about three mutually perpendicular axes relative to the handlebar subassembly, comprising a turning axis about which the front wheel turns, a lateral axis about which fore and aft movement occurs and a drive rod axis, the drive rod extending through the turning axis during fore and aft and turning movement; and
   a pivoting member mounted on the cycle frame, the drive rod being connected to the pivoting member by a rear connection, movement of the pivoting member being transferred to a primary driving subassembly driving the rear wheel;
   wherein the pivoting member comprises a straight member extending between the hinge and the pivoting member, and wherein the drive rod is connected to a sleeve through which the riser extends, the riser being free to rotate within the sleeve.

8. The cycle of claim 7 also including a pedal also driving the primary driving subassembly and the rear wheel.

9. The cycle of claim 8 wherein the primary driving subassembly comprises a drive chain mounted on a sprocket.

10. A cycle configured to be ridden by a rider, the cycle comprising a frame, a front wheel, a rear wheel, handlebars turning the front wheel relative to the frame and to the rear wheel and a pedal for driving the rear wheel, the cycle further comprising:
   a steer tube on which the front wheel is mounted;
   a riser stem connected to the handlebars and the steer tube to turn the steer tube and the front wheel about a turning axis;
   a hinge between the riser stem and the steer tube so that the riser stem is rotatable about a hinge axis extending perpendicular to the turning axis so that the handlebars can be rotated fore and aft about and arcuate path as the front wheel turns about the turning axis;
   a drive rod mounted at a drive rod first end to the riser stem above the hinge, fore and aft movement of the handlebars causing the drive tube to move fore and aft relative to the frame and to pivot relative to the frame about a drive pivot axis extending perpendicular to the frame;

a sleeve wherein the drive rod is mounted to the riser stem by the sleeve so that the angular orientation of the sleeve relative to the riser stem varies as the riser stem rotates about the turning axis and the planar orientation of the drive rod remains fixed relative to the frame as the drive rod moves fore and aft;

an actuator extending between a drive rod second end and the pedal to transfer a force from the drive rod to the pedal as the drive rod moves fore and aft, so that fore and aft arcuate movement of the handlebars imparts a force acting about a moment arm to the pedal, so that the cycle can be driven both by fore and aft arcuate movement of the handlebars applied by the rider through the rider's upper body together with rotation of the pedals powered by the rider's lower body, and wherein turning the cycle about the turning axis is uninhibited by fore and aft arcuate rotation of the handlebars.

11. The cycle of claim 10 wherein the cycle comprises a bicycle.

12. The cycle of claim 10 wherein the sleeve is shiftable along the riser stem to adjust arcuate travel of the handlebars to accommodate riders of different sizes.

13. The cycle of claim 10 wherein the actuator comprises a chain.

14. The cycle of claim 10 wherein the actuator comprises a secondary drive rod.

* * * * *